UNITED STATES PATENT OFFICE.

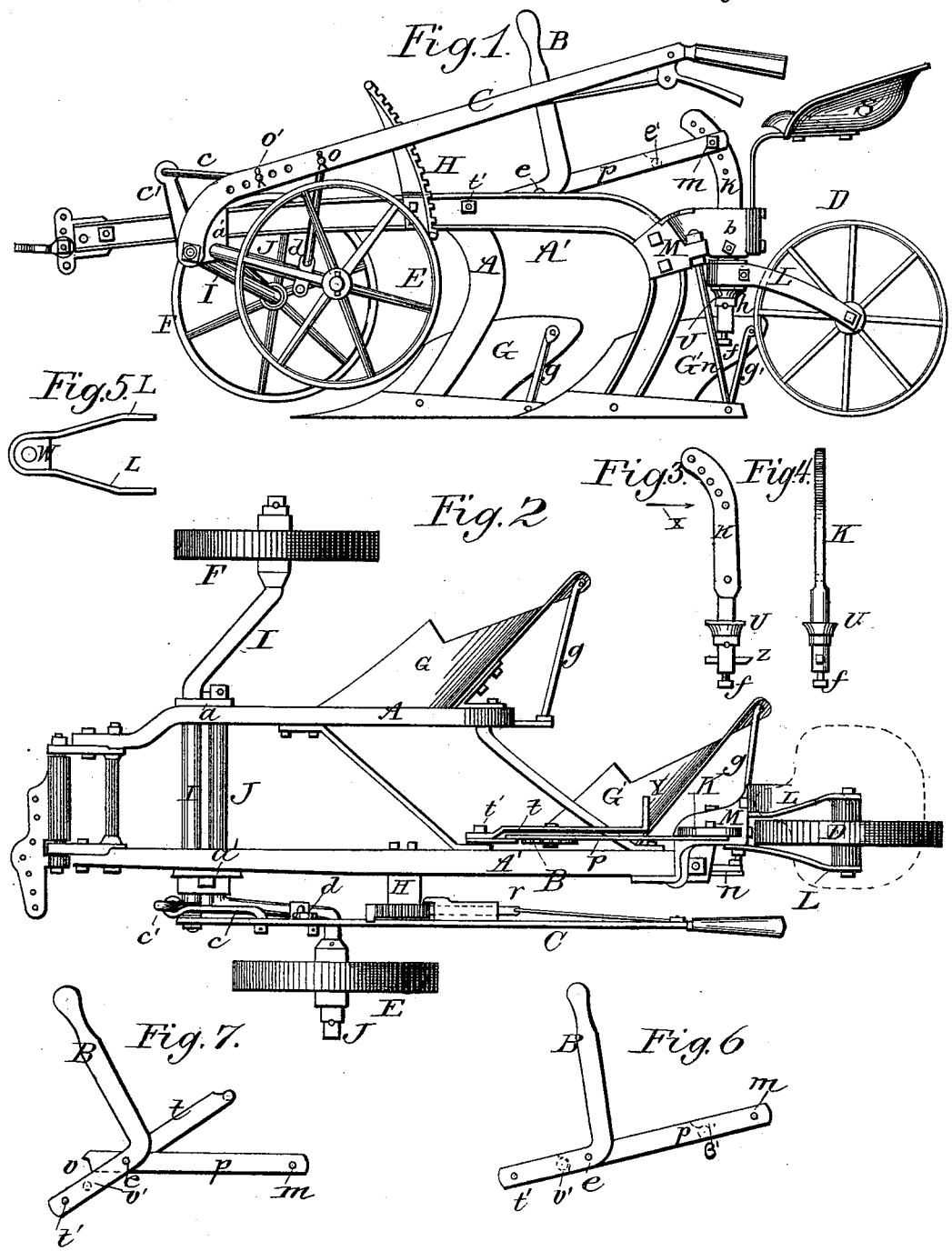

GILPIN MOORE, OF ROCK ISLAND, ILLINOIS.

WHEEL-PLOW.

SPECIFICATION forming part of Letters Patent No. 403,892, dated May 21, 1889.

Application filed January 3, 1888. Serial No. 259,721. (No model.)

*To all whom it may concern:*

Be it known that I, GILPIN MOORE, of the city of Rock Island, in the county of Rock Island and State of Illinois, have invented new and useful Improvements in Sulky or Wheel Plows, of which the following is a specification.

The object of this invention is to provide a wheel for carrying the plow when in operation, and to be disengaged when the plow is thrown out of the ground, so that the heel of the landside may drag on the ground and prevent the plow from running forward onto the horses' heels in transportation or descending a hill, as it would do if mounted on three wheels, thereby doing away with the necessity of a tongue for keeping the plow off the animals in going to and from the field. I attain this object by means of an adjustable wheel following in the land-furrow and arranged and operated by means of a pivoted upright standard, in combination with a knuckle-jointed foot and hand lever, to the end that the plow may be elevated or lowered at pleasure, so as to regulate it to any depth of plowing and to enable the attendant to carry the weight of the plow entire or in part on the caster-wheel.

In the drawings, Figure 1 is a landside elevation of a wheel-plow embodying my invention, with the land-wheel adjusted to land-height above the bottom of the plowshare, and the furrow-wheel to or nearly to same height. Fig. 2 is a top view of the same parts, showing the double-cranked axles of the front wheels and the relative position of the caster-wheel behind the rearmost mold-board. Fig. 3 is a side view of the perforated pivoted upright stand that supports the caster-wheel arms as detached from the frame of the plow. Fig. 4 is an edge view of the same similarly detached, as viewed in the direction of the arrow *x* in Fig. 3. Fig. 5 is a top view of the caster-wheel arms removed from its position upon the plow. Fig. 6 is the rear tilting-lever, showing it detached from the frame of the plow. Fig. 7 is a similar view of same parts shown in Fig. 6, with the tilting-handle thrown forward to lower the plow.

A A' are the two beams of the plow; B, the rear tilting-lever for raising and lowering the rear end of the plow; C, the forward tilting-lever for elevating and depressing the forward end of the plow.

D is the caster-wheel, and E the land and F the furrow wheels.

G and G' are the two mold-boards.

H is the segment-rack, between the teeth of which the spring-pawl *r* enters to hold rigidly the adjustment of the two double-cranked axles I and J.

K is the pivoted standard supporting the caster-wheel arms L L.

M is a bracket, and is bolted rigidly to the landside-beam of the plow, and through it passes the pivoted upright standard K, which is pivoted thereto by the bolt *b*.

*p* is a connecting-bar taking the two pivotal bolts *e* and *m*, as shown in Fig. 7, and is jointed at *e* to and between the hand-lever B and foot-lever *t*, both the hand and foot levers being alike pivoted to the plow-beam at *t'*. The bar *t* at its rear end is turned out at a right angle and forms the foot-rest *y* for the driver sitting upon the seat S.

By means of the holes passing horizontally through the upright standard K, the caster-wheel may be adjusted to any desired point of elevation relatively, and there secured by the pivot-bolt *m*, and after that any further adjustment of the rear end of the plow, by either raising or lowering it, is readily accomplished by the handle B, assisted by the foot-rest *y* while the plow is in working operation. Thus by pressing the handle B forward, as shown in Fig. 7, the pivotal point *t'* being constant, the connecting-bar *p* is carried forward, and with it the upper end of the upright standard K, which in turn causes the caster-wheel to be elevated relatively, or, in other words, causes the rear end of the plow to be lowered, which latter is the result sought to be accomplished. By reversing the lever B and drawing it back to its original position, as shown in Fig. 6, the two bars *t* and *p* coincide, and the projection *v* on the front end of the bar *p*, impinging against a stop, *v'*, locks the two bars *t* and *p* in a straight line, and thus raises the plow to its former height. By these means the raising and lowering of the plow and the consequent depth of the plowing, as well as the dropping of the heel of the landside of the plow to drag upon the ground to prevent the plow (where no tongue is used) from running forward onto the horses while on the road or descending a hill, are all placed under the easy control of the attendant while the plow is in motion. The upper end of the perforated standard K is curved, preferably, forward, as shown, so as to bring the horizontal bolt-holes or perforations at different distances from the fixed point $t'$. This is found to be very desirable in order to give the plow the fixed adjustment required—that is, an adjustment which is not to be changed while the plow is in use. Through the lower end of this upright standard an adjustable scraper, $z$, passes, and is there firmly held by the set-screw $f$, Fig. 3.

What I claim as new, and desire to secure by Letters Patent, is—

1. In a sulky-plow, the combination, with a beam of the same and a bracket bolted thereto, of an upright pivoted in said bracket and provided with a caster-wheel, a jointed rod, $p$, pivoted adjustably to the upper end of said standard, and the angular lever B, pivoted to said beam and to said rod $p$ at different points, substantially as set forth.

2. In a sulky or wheel plow, the combination, with a beam of the same and a bracket bolted thereto, of an upright, K, pivoted in said bracket and provided with curved perforated upper end, a caster-wheel connected with said upright, a jointed rod, $p$, a bolt, $m$, for adjustably connecting said rod with the upright, a projection, $v$, formed upon the end of said rod, an angular lever, B, pivoted to said beam and to said rod $p$ at different points, and provided with a stop, $v'$, to engage the projection $v$ and lock the rod $p$ in position, and foot-lever $t$, substantially as set forth.

GILPIN MOORE.

Witnesses:
C. H. DEERE,
C. O. NASON.